(12) United States Patent
Boccadoro et al.

(10) Patent No.: US 6,600,125 B1
(45) Date of Patent: Jul. 29, 2003

(54) PROCESS PARAMETER OPTIMIZATION IN ELECTRICAL DISCHARGE MACHINING

(75) Inventors: Marco Boccadoro, Verscio (CH); Andrea Buzzini, Arcegno (CH); Stefano Bonini, Brissago (CH)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 09/688,520

(22) Filed: Oct. 16, 2000

(30) Foreign Application Priority Data

Oct. 18, 1999  (DE) ......................................... 199 50 151

(51) Int. Cl.[7] ............................................... B23H 7/20
(52) U.S. Cl. ................................ 219/69.17; 219/69.13; 219/69.18
(58) Field of Search ........................ 700/162; 219/69.12, 219/69.13, 69.17, 69.18; 205/646

(56) References Cited

U.S. PATENT DOCUMENTS

| | | | | |
|---|---|---|---|---|
| 4,057,703 A | * | 11/1977 | Pfau ........................ 219/69.13 |
| 4,247,749 A | | 1/1981 | Wavre ....................... 219/69.2 |
| 4,948,934 A | | 8/1990 | Behmer ..................... 219/69.2 |
| 5,051,912 A | * | 9/1991 | Johanson et al. ........... 700/162 |
| 5,267,141 A | * | 11/1993 | Morita et al. ............. 219/69.13 |
| 5,571,426 A | * | 11/1996 | Akemura ................... 219/69.17 |
| 5,637,240 A | * | 6/1997 | Izumiya et al. ........... 219/69.13 |
| 5,847,352 A | * | 12/1998 | Yuzawa et al. ............ 219/69.13 |
| 5,919,380 A | * | 7/1999 | Magara et al. .............. 700/162 |

FOREIGN PATENT DOCUMENTS

| | | |
|---|---|---|
| DE | DD 298 361 A5 | 10/1983 |
| DE | DD 298 362 A5 | 10/1983 |
| DE | 40 25 294 C2 | 2/1991 |
| DE | 693 00 988 T2 | 12/1995 |
| DE | 196 10 082 A1 | 9/1997 |
| DE | 196 14 130 A1 | 10/1997 |
| EP | 0 340 569 A1 | 11/1989 |
| EP | 0 505 570 A1 | 9/1992 |

OTHER PUBLICATIONS

M. Weck et al., *"Adaptive Regelung des Senkerodierens"*, VDI Z.; Bd. 127, No. 9, 1985, pp. 319–323, XP002160439, VDI Verlag GmbH, Düsseldorf, Germany.

*Official Search Report* corresponding to European Patent Application Ser. No. EP 00 11 8496, dated Mar. 2, 2001.

* cited by examiner

*Primary Examiner*—Geoffrey S. Evans
(74) *Attorney, Agent, or Firm*—Marshall, Gerstein & Borun

(57) ABSTRACT

A method and apparatus for electrical discharge or electrochemical machining of workpieces, in which a machining electrode is moved relative to a workpiece, the machining is performed in cycles, and the appropriate process parameters are adjusted for machining of the current cycle with consideration of process parameters of the current cycle. To improve this method and the apparatus to the extent that improved geometric machining accuracy is made possible without time losses, stored process parameters of at least one previous cycle are also considered for adjustment of the process parameters of the current cycle.

20 Claims, 4 Drawing Sheets

SECTOR
i
i+1
i+2
i+3

LAYER
k
k+1
k+2
k+3

PROCESS PARAMETER OPTIMIZATION IN ELECTRICAL DISCHARGE MACHINING

FIELD OF THE INVENTION

The present invention concerns a method and apparatus for electrical discharge or electrochemical machining of workpieces in which the machining electrode is moved relative to a workpiece, the machining comprises cycles and appropriate process parameters are adjusted for machining of the current cycle, and especially with consideration of process parameters of the current cycle.

BACKGROUND OF THE INVENTION

Numerous cyclic machining methods are described in the prior art, especially planetary EDM methods.

Such a generic planetary EDM method is known, for example, from "Industrie-Anzeiger", Special Issue, April 1981, page 109ff. This method involves planetary EDM of cavity sinkings, in which a cyclic translatory movement is conducted for machining between the machining electrode and workpiece laterally in planes arranged transversely to the direction of advance. Each plane is then machined cyclically by the machining electrode, the cyclic translatory movements being used in the form of orbital movements to widen a machining or for layered machining.

During electrical discharge machining, material removal occurs on the electrically conducting workpiece, owing to the fact that the machining electrode is brought to the workpiece and electrical discharge occurs. Machining then occurs by the translatory movement between the electrode and the workpiece in an appropriate working liquid. A gap width control superimposed on the translatory movement ensures maintenance of the appropriate spacing between the machining electrode and the workpiece.

It is known from the generic document that the speed of the translatory movement can be controlled as a function of the current process state, in order to avoid losses of efficiency, for example, to carry out the translatory movement with increased speed in the no-load section (sections of the cyclic translatory movement, in which material removal no longer occurs during machining). A shortcoming in this method, however, is that strong fluctuations of the true path can occur within one cycle as a function of the geometry of the reference path in the course of machining. Moreover, braking or delay at tricky sites is problematical at increased speeds. Specifically, it can happen during abrupt changes in direction, for example, that braking is not carried out in a timely fashion and, in the extreme case, the machining electrode can even collide with the workpiece. Because of this, the gap width regulation system can be overtaxed, so that incorrect discharges increasingly occur, which result in increased wear of the machining electrode.

A further developed planetary EDM method is known from EP 0 340 569, which seeks to solve the above problems. Each planetary revolution (cycle) is subdivided into a specific number of angle positions of the planetary angle, and the true path, i.e., the effective deflection amplitude of the machining electrode, is stored for each angle position. The reference path for the pending planetary revolution is then determined in advance from the true values from at least one of the past planetary revolutions and the expected volume of removal. The process runs at almost constant planetary speed. The most erosion-intense discharges possible and therefore a shorter machining time are also sought. The true movement, as mentioned, can be determined from one or more preceding planetary revolutions or, alternatively, from a trial run without erosion. The emphasis in this method therefore lies in accelerating the machining process.

To summarize, it can be stated that this document considers the geometric data of previous planetary revolutions, in order to adjust the geometric data of the pending planetary revolution. Process parameters of previous planetary revolutions are not considered.

In principle, in all known devices, the corresponding CNC control views machining as completed as soon as the undersize is reached. The undersize to be reached, however, refers to a theoretical gap width stored in process parameter data sets. A change in effective gap width, as is usually produced by the gap width control, remains unrecognized, which can have extremely harmful effects on contour accuracy.

OVERVIEW OF THE DISCLOSED DEVICE

The underlying task of the disclosed device is to improve the generic method to the extent that an improved geometric machining accuracy is made possible without time losses, especially to increase process safety and reproducibility.

To solve the task in a generic method, stored process parameters of at least one previous cycle are also used to adjust the process parameters of the current cycle.

The invention proceeds from the observation that, in cyclic machining, a location-bound development of certain process parameters can be established. If a disturbance, for example, occurs at one site of a cycle, the development of this disturbance is also generally apparent in the subsequent cycle at the same site.

Based on this observation, the illustrated device stores the process behavior for already performed cycles and evaluates the stored data to establish certain process parameters of the pending cycle, so that sections of the pending cycle to be machined can be arrived at in advance. For example, depending on whether a disturbance-free section, a no-load section or a critical section is expected, the process parameters to be used are adjusted accordingly. Process disturbances and time losses can therefore largely be avoided to advantage, good shape trueness can be achieved and the process optimized overall.

Preferably, at least one process parameter is measured during at least one preceding cycle. At least one process parameter to be adjusted in the current cycle is derived from this measured parameter. The at least one derived process parameter is stored during the preceding cycle and the at least one stored process parameter is adjusted during the current cycle.

The cycles, including machining (which is also referred to as cyclic machining below), preferably involve planetary erosion during cavity sinking or pocketing during wire erosion. However, any wire erosion machining, in which a full cut and a certain number of aftercuts are carried out, can, in principle, be referred to as cyclic.

Process parameters permanently stored in a table, alternatively or additionally, are preferably used for adjustment of the process parameters, which, in particular, are established with reference to optimization of erosion, with reference to performance of no-load and/or with reference to performance of the guaranteed disturbance-free machining. Stipulated process parameters can therefore also be permanently stored for specific standard situations, like no-load machining, or also for specific compositions of the workpiece, machining electrode, geometry being machined, etc., which can then be called up in specific situations for instantaneous machining. These can be called up, in particular, for those situations when instabilities in process parameter control occur.

The preceding cycles are preferably investigated by a reference/actual value comparison of the measured process parameter on sections in which a machining disturbance, a no-load condition and/or another condition deviating from the normal case occurs, and adjusted process parameters are set, at least in the corresponding sections of the current cycle. Sections of the cycle are advantageously characterized, in which specific situations occur, and for which optimized process parameters can be worked out in the subsequent cycle with respect to the situation.

Adjusted process parameters are preferably already set in one region before the corresponding sections of the current cycle. For example, abrupt transitions in process parameters that otherwise could lead to machining inaccuracies can therefore be advantageously avoided.

The length of the region is preferably chosen as a function of planetary speed. For the case of wire erosion, the planetary speed corresponds to the wire advance speed.

Machining is preferably divided into a number of layers and sectors and the relevant process parameters are stored layer-wise and sector-wise. For cavity sinking in planetary erosion, the volume being eroded, for example, can be subdivided into layers lying normal to the direction of advance. At the same time, the orbital movement can be divided into sectors, so that, as a result, each machining site can be specified by a sector element. Location-related process information can be allocated and stored in simple fashion on this account.

For wire erosion, these layers can correspond to the full cut and the aftercuts and the sectors are defined along the aftercut.

The process parameters for the current cycle are preferably set at the beginning of the sector, which are derived from the measured process parameters of preceding cycles, and the process parameters of the current cycle are recorded and stored at the end of a sector as measured quantities for the cycle following the current cycle. Process instabilities are advantageously avoided because of this arrangement. By selecting the sector length, the "control behavior" of the entire process control can then be influenced, i.e., a longer sector length therefore leads to longer sections, in which this process adjustment acts almost as process control.

After adjustment of the process parameters at the beginning of a sector, up to measurement of the process parameters at the end of a sector, only selected process parameters are preferably monitored for particular disturbances. This has the advantage that, during quasi control within a sector, at least those process parameters that can exhibit a significant disturbance situation are monitored. These disturbances can then be reacted to with stored process parameters, which lead in each case to a disturbance-corrected situation.

The stored process parameters after each cycle are preferably multiplied by a weighting factor. This has the advantage that, depending on the situation, certain cycles contribute more strongly or less strongly to determination of the current process parameters. In particular, during corresponding multiplication of all process parameters within a cycle by a factor smaller than one, the process parameters of cycles farther downstream can be included less strongly in an averaging of the process parameters of a specific number of downstream cycles.

With particular preference, cycles with disturbance-affected sections can be multiplied by an increased weighting factor, so that these advantageously have a stronger effect on the subsequent cycles. This disturbance could repeat again, for example, only in the next cycle but one, or in one of the subsequent cycles. By this weighting, special measures can also be taken in these cycles in the relevant sections.

The process parameters to be stored preferably include at least one of the following parameters:

the sum of servo-inteps errors, the discharge power, the average discharge current, the average erosion voltage, the ignition delay time, the percentage of short-circuit pulses, the percentage of instability, the frequency of program return movements, the number of interventions of the process to avoid degenerate pulses, the average pause voltage (i.e., the average voltage during the pause between pulses).

The process parameters to be adjusted preferably include at least one of the following parameters:

the planetary speed pulse parameters, especially period duration pause duration current voltage servo control parameters, especially amplification servo reference value programmed return movements, especially the frequency of return movements the stroke of return movements the strategy during return movements.

The planetary speed is preferably optimized as the process parameter being adjusted with respect to erosion, in which this is determined from several cycles with different planetary speed, each cycle being performed with a constant planetary speed. Advantageously, a planetary speed optimized automatically with respect to erosion can be determined with reference to several test cycles or actual machining cycles.

The planetary speed is preferably optimized as a process parameter being adjusted with respect to machining accuracy, in which a cycle is conducted with a planetary speed reduced relative to the erosion-optimized planetary speed and the planetary speed optimized in machining accuracy is determined by means of the measured process parameters. The machining accuracy can advantageously be strongly increased, especially during the end phase of machining.

The erosion-optimized planetary speed and/or the planetary speed optimized in machining accuracy is then preferably redetermined periodically after a certain number of cycles or on the occurrence of relevant changes in process parameters.

Other features and advantages are inherent in the disclosed apparatus or will become apparent to those skilled in the art from the following detailed description and its accompanying drawings.

DETAILED DESCRIPTION OF THE ILLUSTRATED DEVICE

Figure 1:
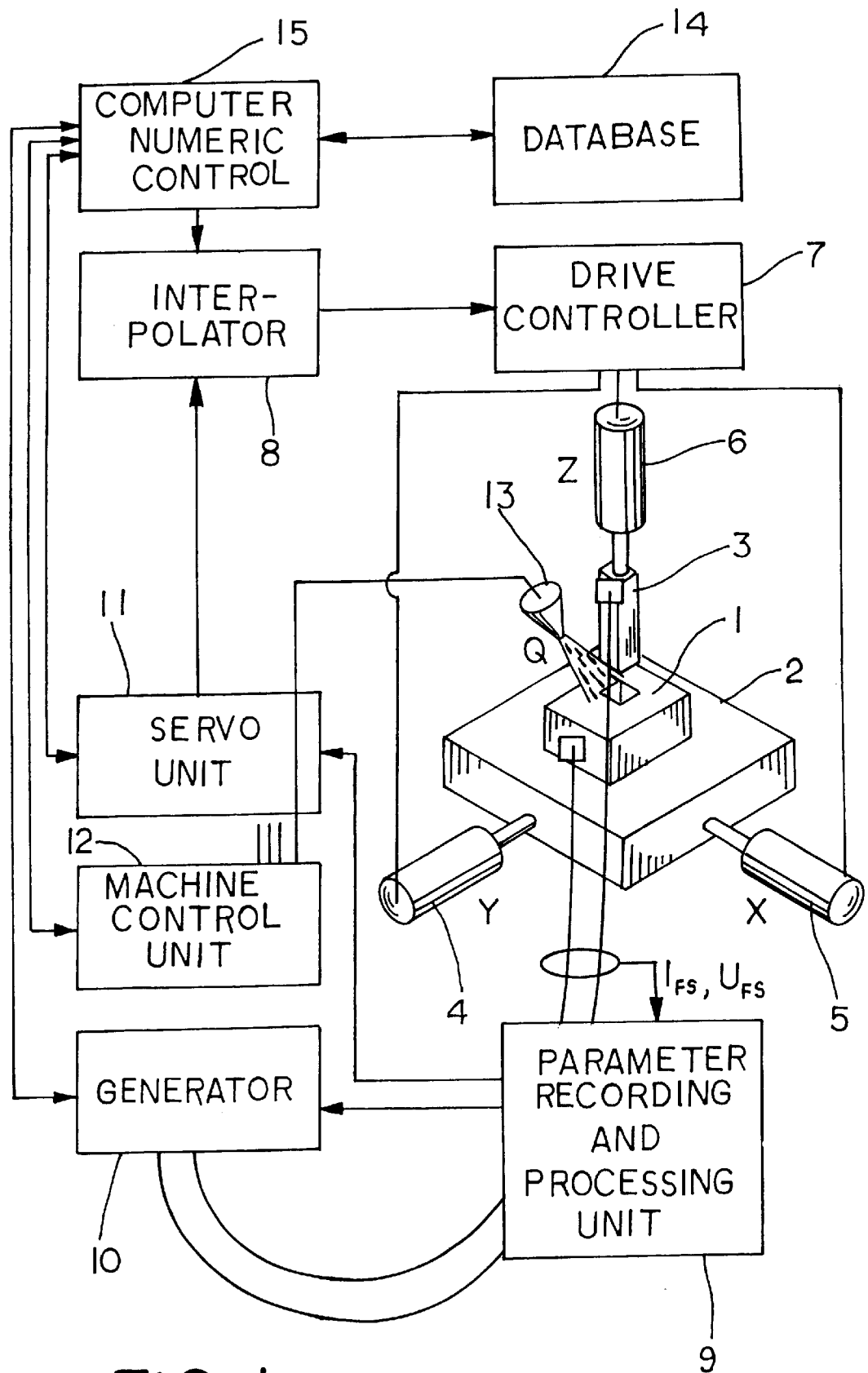
FIG. 1 shows a schematic view of an electrical discharge machine.

FIG. 1 shows a schematic view of an EDM machine, laid out for planetary electrical discharge machining. A workpiece 1 is tightened on a machining table 2 and machined by a machining electrode 3. To create a relative movement between machining electrode 3 and the workpiece 1, the machining table 2 can be moved in a horizontal plane by drives 4 and 5 acting in the X and Y direction. The machining electrode 3 can also be sunk into workpiece 1 by a drive 6 acting in the Z direction.

The three drives 4–6 are driven by a drive controller 7, which again obtains, from an interpolator 8, the corresponding step values (in the case of stepping motors) for the individual drives 4–6. The process parameters occurring during machining, like the actual values of the machining current $I_{FS}$ and the machining voltage $U_{FS}$ in the machining gap, are also recorded by a parameter recording and processing unit 9, processed and sent to a generator 10. The parameter recording and processing unit 9 is coupled to generator 10 for this purpose, which, in response to the recorded actual values of the process parameters, generates specific reference values of the machining current $I_{FS}$ and the machining voltage $U_{FS}$ and has them applied to the machining electrode 3 and workpiece 1 via the parameter recording and processing unit 9.

The parameter recording and processing unit 9 is also coupled to a servo unit 11, which, in response to the recorded process parameters, produces gap-width-regulating process parameters, like planetary speed, for the drive control 7 via interpolator 8. The interpolator 8 simultaneously calculates the individual steps to be conducted by the corresponding drives 4–6, for example, by means of vectors that determine the geometry, and the planetary speed fed from the servo unit 11. The parameter recording and processing unit 9, for example, recognizes, by means of the recorded actual values of machining current $I_{FS}$ and machining voltage $U_{FS}$ in the machining gap, whether a short circuit occurs and calculates a corresponding planetary speed based on the short-circuit situation, which it feeds to servo unit 11.

A machine control unit 12 is also coupled to servo unit 11. The controller 12 supplies a rinsing liquid stream under a specified pressure via a rinsing nozzle 13 into the machining gap between workpiece 1 and machining electrode 3.

The servo unit 11, the controller 12, generator 10 and a database 14 are coupled to a computer numeric controller 15, which controls the process parameters of the individual units. The database 14 serves to store the process parameters, which are used by the computer numeric controller 15, especially for standard situations (disturbance, no-load condition, etc.). The computer numeric control unit 15 can resort to the permanent values for the corresponding process parameters stored in the database 14, especially in situations with increased process instability.

Figure 2A:
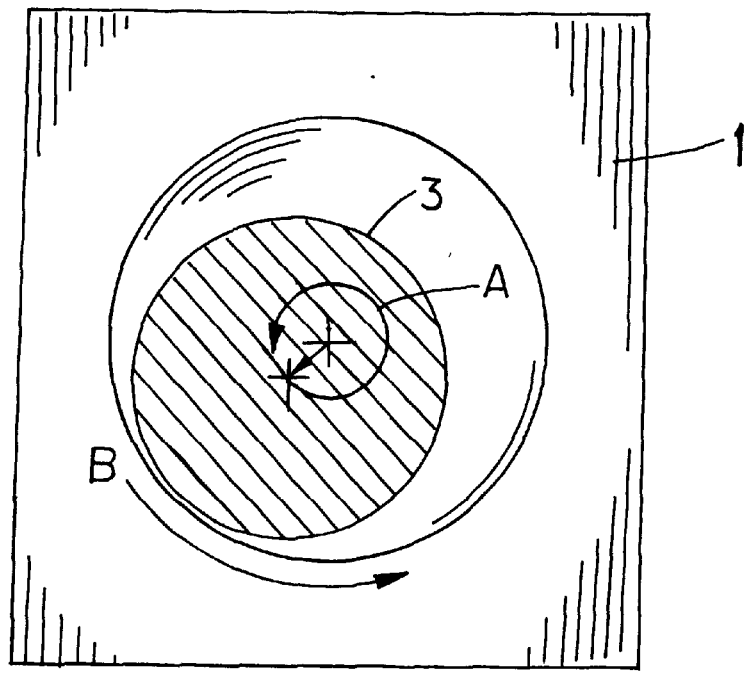
FIGS. 2a–2b illustrate an elevation and cross section of a round machining electrode during planetary erosion of a workpiece in the EDM machine of FIG. 1.
Figure 2B:
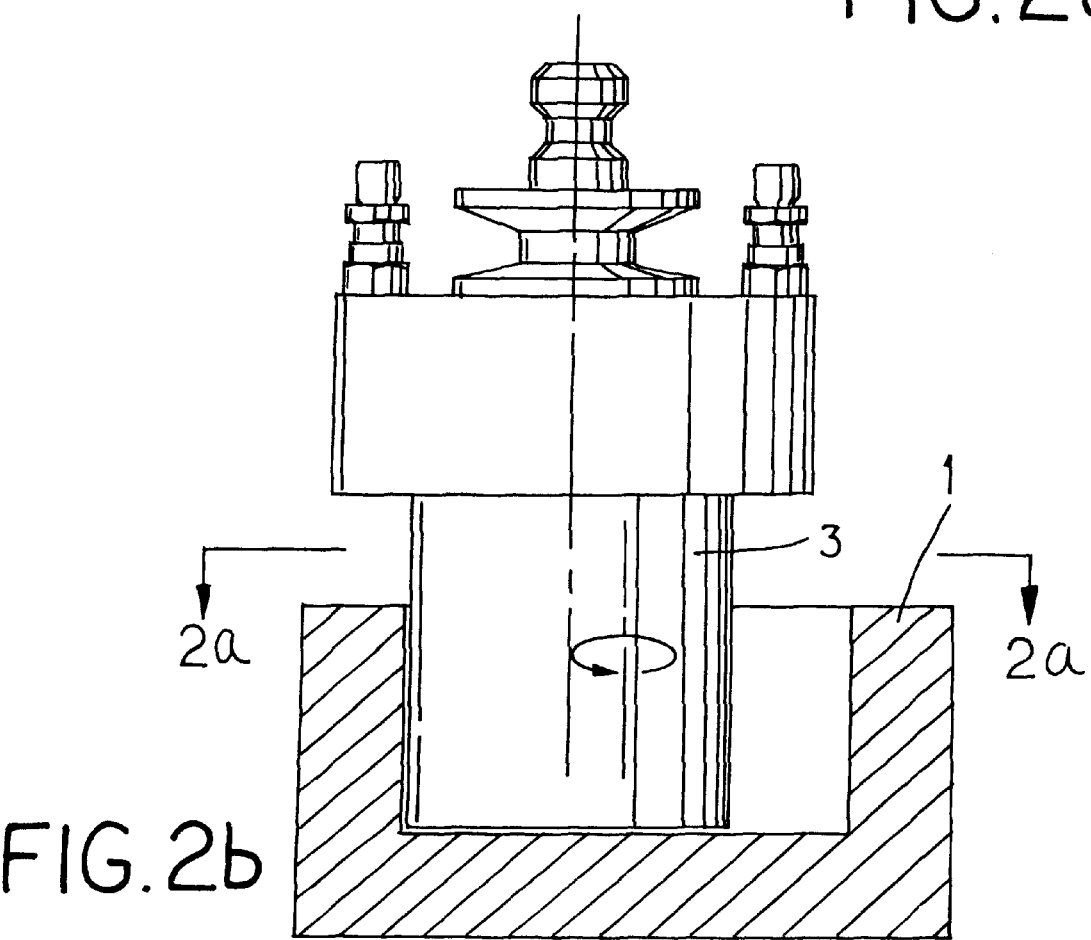
Figure 3A:
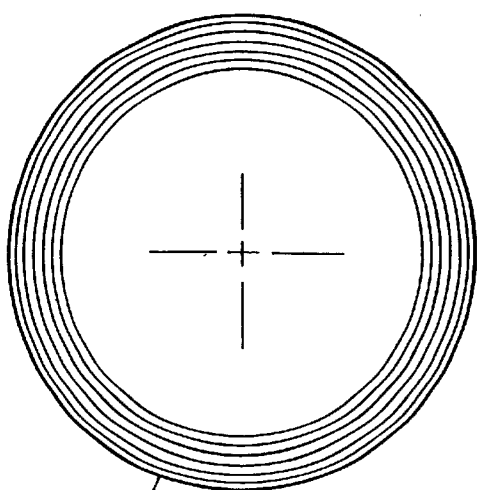
FIGS. 3a–3d illustrate a schematic view of the subdivision of machining in layers and sectors, each in an elevation and cross sectional view.
Figure 3B:
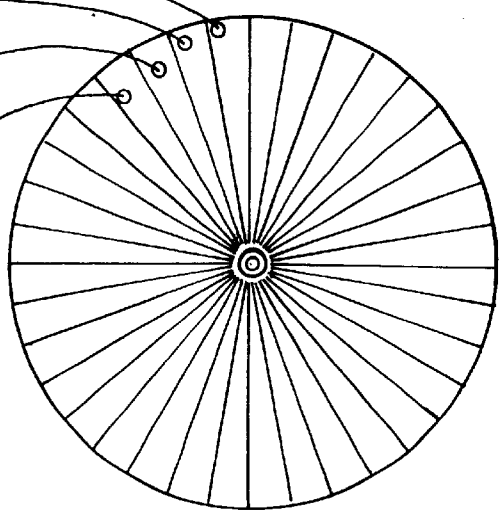
Figure 3C:
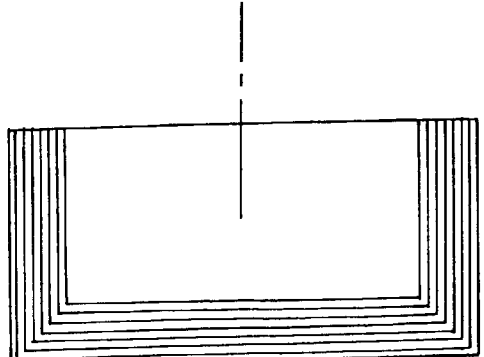
Figure 3D:
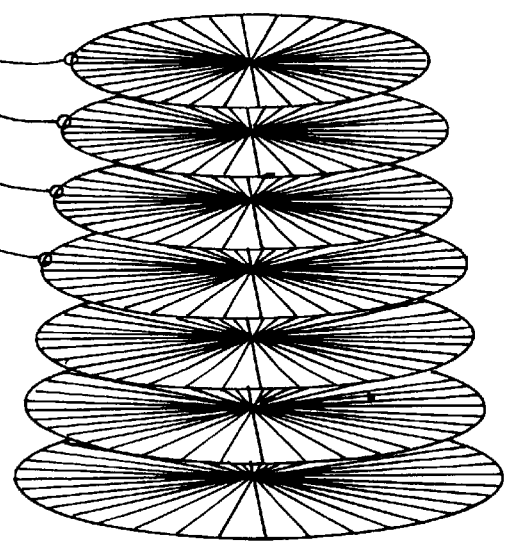

The workpiece 1 and the machining electrode 3 are each shown in an elevation and cross sectional view during planetary erosion in FIGS. 2a and 2b. During planetary erosion, a progressive widening of a cavity occurs, owing to the fact that a cyclic, generally circular, relative movement (orbital movement) Occurs between workpiece 1 and the machining electrode 3 on a plane normal to the direction of advance (the plane of the sheet in FIG. 2a), and this relative movement is superimposed by a gap width regulation. This cyclic relative movement can be process-independent. The gap width regulation occurs along a planetary vector as a function of the process parameters and process conditions in the spark gap.

For correct understanding of the following description, a definition of the terms planetary speed and translatory speed is required. The planetary speed is the speed at which the planetary movement, for example, the circular relative movement (orbital movement) is conducted. The machining electrode 3 for this purpose is moved along orbital movements with a specified planetary speed, as shown in FIG. 2a by the circular arrow A. The planetary speed is then a gauge of how quickly the machining electrode 3 is moved along this orbital movement imparted by the X and Y drives 4 and 5. The translatory speed is the relative speed between machining electrode 3 and workpiece 1 at a certain site, caused by the planetary speed, for example, at site B in FIG. 2a. The geometry of the machining electrode 3 and workpiece 1 therefore establishes, at each time for each point between machining electrode 3 and workpiece 1, a specific ratio of planetary and translatory speed.

The choice of optimal planetary speed is very important, because this decisively influences the process. If it is too high, so that the servo unit 11 can no longer maintain the ideal erosion position, then servo unit 11 returns the machining electrode 3 along the planetary vector and vice versa. The planetary vector lies in a direction slightly sloped to the Z direction in the example depicted in FIGS. 2a and 2b, so that the machining electrode 3 is raised from the front surface and from the side surface of the depression as soon as the planetary speed and the translatory speed accompanying it is greater than the erosion rate at the machining site.

It is known that a rinsing effect can also be achieved by the relative movement between machining electrode 3 and workpiece 1. A higher translatory speed gives a better rinsing effect, so that the eroded particles are better removed from the spark gap. With equal adjustment of the process parameters, a higher planetary speed, and therefore a higher translatory speed accompanying it, leads to a lower conductivity. The gap width is therefore inversely proportional to planetary speed. At a slower planetary speed, because of the larger machining gap and the longer spark, it can be recognized more accurately what must still be eroded (i.e., the machining accuracy can be determined with increased accuracy).

It is also known that the eroded volume is larger, the longer the electrode pauses at a machining point. The eroded volume is therefore inversely proportional to the translatory speed, and therefore also inversely proportional to planetary speed in a specific region (such a region in FIG. 4b, for example, lies above the marked planetary speed $V_{P3}$, see further below).

Reference is now made to FIGS. 3a to 3d, each of which shows how the cavity sinking of machining electrode 3 into workpiece 1 is divided into layers k, k+1, k+2, k+3, etc. and sectors i, i+1, i+2, i+3, etc. per layer. It is readily apparent in FIG. 3c how each individual layer exhibits a larger machining surface with increasing depth, both on the frontal surface and oil the side surface of the depression. The layers just defined generally do not correspond to the individual orbital movements or revolutions, as usually occur in planetary erosion. Thus, a number of revolutions can be required to machine out a layer during correct application of the disclosed approach.

The layers just described typically have a thickness from 10 to 20 $\mu$m, so that complete machining generally consists of a number of these layers. Depending on the current planetary strategy (spiral widening for standard electrodes or star-like widening for sharp-edged machining electrodes, continuous rotation of a selected axis during sinking, etc.), progressive adjustment of the layer thickness can occur. At the end of certain machinings, under some circumstances, very fine layer thicknesses of less than 5 $\mu$m can also be provided, so that any discontinuity is avoided.

For each sector of a layer, for example, the following process parameters are recorded and stored per cycle by the computer numeric control unit 15 during machining:

the sum of the servo-inteps error (i.e., the total number of return movements along the planetary vector per sector), the discharge power P, the average discharge current I, the average erosion voltage U (gap voltage, discharge voltage, no-load voltage), the ignition delay time Td, any short circuits, any instability, the frequency of programmed return movements (timer frequency), the number of interventions of the process to avoid degenerate pulses, etc.

The computer numeric control unit 15 then records the actual value of each of the mentioned process parameters and determines its deviation from the reference value obtained from database 14. This evaluation preferably occurs based on several performed revolutions (i.e., several complete revolutions are completed per layer). However, one revolution can also be sufficient, especially during wire erosion, in which only a limited number of aftercuts, and therefore also a limited number of cycles, are present.

By executing several revolutions, the confidence level of the recorded actual values can be verified and a better prediction made. The latest revolutions, in most cases, are of greater significance, for which reason the computer numeric control unit 15 generally weights them more strongly than revolutions farther back. For this purpose, the computer numeric control unit 15 multiplies the stored actual values of the process parameters with each revolution by a "forgetfulness factor" (for example, a factor of less than 1), so that their significance, in most cases, diminishes with time into the future. However, it is possible that, in certain cases of machining, the process will tend toward a "chaotic" state; in this case, it can be advantageous to assign greater significance to older revolutions.

The computer numeric control unit 15, especially on recognizing process disturbances and/or no-load conditions, which it determines from the deviation of an actual value from the reference values of the process parameters, adjusts the following process parameters:

the planetary speed, the pulse parameters, especially
    the period duration T,
    the pause duration P,
    the current I,
    the voltage U, the servo control parameters, especially
    amplification (gain),
    servo reference value (compression)

programmed return movements, especially
    the frequency of return movements,
    the stroke of the return movements,
    the strategy in return movements.

The individual values of the process parameters being adjusted, both during the "normal", disturbed and/or no-load machining, are obtained by the computer numeric control unit 15 from database 14.

If hampered or critical machining conditions now occur within a layer during a cycle or planetary revolution in a section (over one or more sectors) of the revolution, the computer numeric control unit 15, in the subsequent revolutions, adapts the process parameters of a certain number of sectors before said site. By this preventive measure, repeated process degenerations in this section can be avoided and the machining conditions returned to the normal range. How many sector elements before and after the critical region must be introduced or interrupted with special measures to stabilize the process depends essentially on the planetary speed and selected division (sector width). The higher the planetary speed, the earlier the preventive measures are introduced.

Derivation of the process parameters is further explained below by means of a brief example. The computer numeric control unit 15 records per cycle (for example, one planetary revolution), in each sector of a layer at the end of the sector, certain process parameters as actual values, derives certain process parameters to be adjusted from a comparison of these actual values with the corresponding reference values called up from database 14, and stores them. In the subsequent cycle, the process parameters stored for the corresponding sector are called up at the beginning of the sector and adjusted. During the course of a sector, the computer numeric control unit 15 usually does not further intervene in regulation, but only records the actual values of certain process parameters again at the end of this sector. However, the computer numeric control unit 15 can optionally monitor certain particularly relevant process parameters, which, for example, can indicate a serious disturbance (like a collision, etc.) and introduces, on the occurrence of such a disorder, processes permanently stored, for example, in a database 14, in which it adjusts specific process parameters according to the stored data. The computer numeric control unit 15 therefore could derive, in the present cycle, only its process parameters to be adjusted from the measured actual values of the previous cycles and leave the process parameters instantaneously occurring in the present cycle unconsidered.

A For example, if the measured value for the percentage of short circuits within the sector is higher than the corresponding stored reference value at the end of a sector i+3 (for example, 5%), the computer numeric control unit 15 recognizes a disturbance in machining in the sector i+3 and reduces the servo reference value accordingly and increases the pulse pause duration. These two newly determined process parameters can be either calculated by the computer numeric control unit or called up from the database 14 (where they are stored for a disturbance, for example, still dependent on the actual value of the percentage of short circuits). These two new process parameters are stored for the sector i+3 and called up again in the next cycle at the beginning of this sector i+3 and correspondingly adjusted. The computer numeric control unit 15, in the present cycle, can already adjust the process parameters of some sectors before sector i, for example, in sectors i, i+1 and i+2 (for example, in which the process parameters are linearly or otherwise interpolated from their value in sector i−1 to their new value to be adjusted in sector i+3).

The process parameters determined and stored per cycle for each sector and each cycle are multiplied by a weighting factor (for example, less than 1), so that the process parameters of cycles farther back have a lesser effect on the process parameters of the current cycle than those of the cycles less farther back.

In addition, a cycle with reduced planetary speed can periodically be run, for example, every fifty cycles. As a result, because of the lower rinsing effect in this cycle, the machining gap becomes larger and the sparks therefore longer. It can then be recognized more accurately what must still be eroded. This section still to be eroded can be prepared for the subsequent cycle by correspondingly adjusted process parameters, so that, in the subsequent cycle, only these sections are eroded. This scanning cycle therefore serves to increase the machining accuracy and can advantageously be used more intensely, especially right before the end of machining.

Figure 4A:
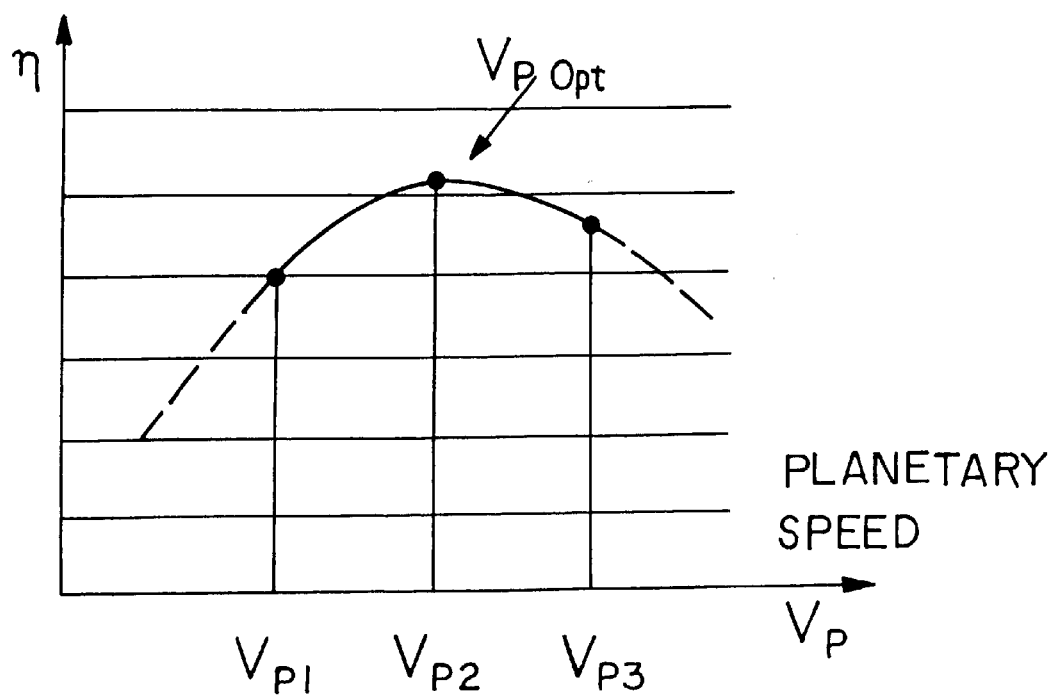
FIGS. 4a–4b are schematic diagrams which illustrate a determination method for automatic determination of an erosion-optimized planetary speed.
Figure 4B:
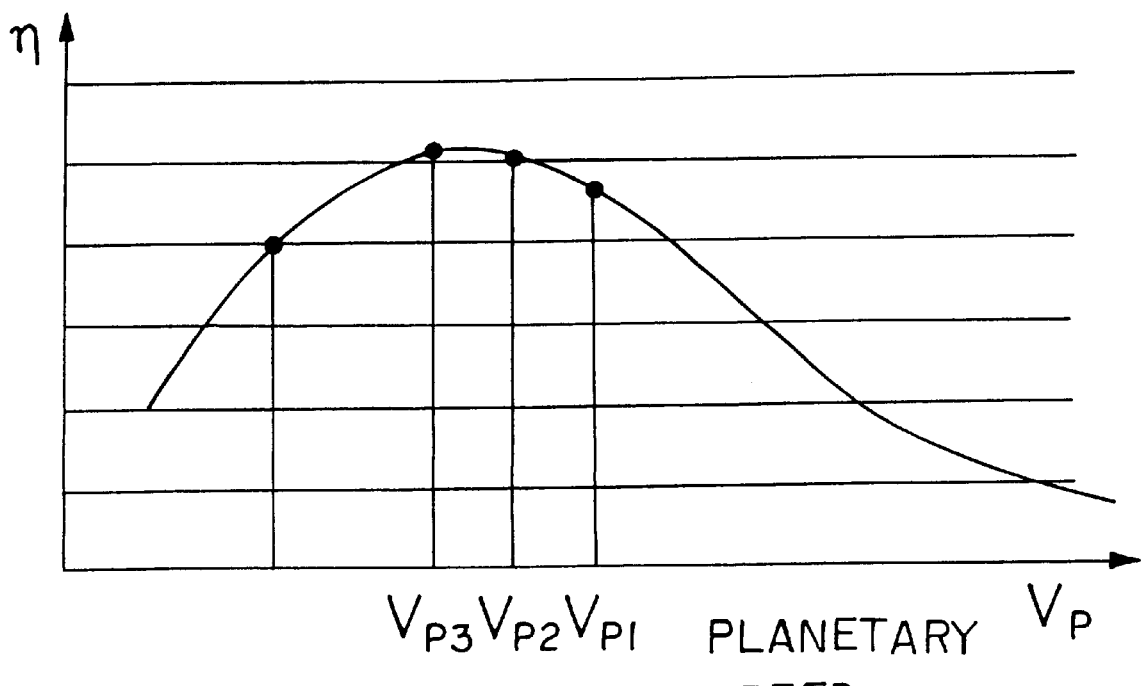

The method described below, in conjunction with FIGS. 4a and 4b, is used for automatic determination of the erosion-optimal planetary speed by the computer numeric control unit 15. Initially a scanning cycle with reduced planetary speed $V_{P1}$ is run, so that an increased gap width is set. Local discontinuities, but also fine geometric features, are better recorded on this account. At least two additional cycles (revolutions) with constant, but different, planetary speed $V_{P2}$ and $V_{P3}$ are then preferably carried out, in which these planetary speeds $V_{P2}$ and $V_{P3}$ should lie in the range of ideal planetary speed. The computer numeric control unit 15 therefore has the process parameters of at least three cycles, with constant different planetary speed $V_{P1}$, $V_{P2}$ and $V_{P3}$. The computer numeric control unit 15, based on the determined process parameters, then determines, by means of a calculation process (for example, a regression calculation or a practical approximation method), the planetary speed $V_{P\ opt}$ that leads to the best erosion values. The planetary speed is then changed in each new revolution, until no noticeable improvement in erosion performance is measured.

As an alternative to this derivation, optimization of the planetary speed can be based on calculation of the efficiency with respect to erosion. In this case, the actual average erosion performance is calculated from the actual values for the discharge current and the erosion voltage. The actual performance is the product of the pulse voltage, the actual value for discharge current and the duty cycle (ratio T/(T+P), in which T is the time of the applied pulse and P the pause time lying between two consecutive pulses). The new planetary speed is then determined in an approximation method as a function of the efficiency and planetary speed of two previously performed revolutions (see also FIG. 4b):

$$V_{P3}=V_{P2}-\lambda*(\eta_2-\eta_1)/(V_{P1}-V_{P2})$$

This determination method can be carried out periodically during the entire machining, in which the cycle with the slower planetary speed (scanning cycle) can also be omitted. For the current machining situation, an erosion-optimal planetary speed $V_{P\ opt}$ is therefore determined. This is then used as a basis, at least during the current planetary revolutions, but also for additional revolutions, but preferably also for several of the subsequent layers k, k+1, k+2.

This erosion optimization occurs, as already mentioned, periodically, for example, every 50 layers, or as required, for example, when a noticeable geometry change can be concluded from the development of the process parameters. Before each cycle, the sector-specific information of the preceding revolutions is erased, or at least downgraded, to determine the erosion-optimal planetary speed $V_{P\ opt}$. Undesired smoothing effects are avoided in this way.

Determination of the erosion-optimal planetary speed $V_{P\ opt}$ as mentioned, can also occur independently of the described scanning cycle, with constant, relatively low planetary speed $V_{P1}$ (FIG. 4a). This separation has the advantage that scanning cycles and erosion optimization cycles are only performed as often as necessary.

After determination of the optimal planetary speed $V_{P\ opt}$, the cyclic machining preferably begins, in which the planetary revolutions following the determination process are initially conducted with this optimal planetary speed $V_{P\ opt}$, in which the relevant process parameters are stored sector-for-sector, as described above. During disturbance-free operation, the erosion-optimal planetary speed $V_{P\ opt}$ so determined is used. If a disturbance becomes noticeable, measures to suppress the disturbance and avoid process degeneration are immediately introduced. Already in the subsequent revolution, the computer numeric control unit 15 is warned to use adjusted process parameters at the corresponding site (i.e., if necessary, also with an altered planetary speed). After a certain number of cycles, a new erosion-optimal planetary speed $V_{P\ opt}$ is again determined and the machining accuracy also checked again, if necessary, by means of a scanning cycle.

To summarize, in the course of layer-wise widening with the determination method just described, the erosion-optimal planetary speed is therefore periodically determined, or only during a noticeable change in machining conditions. With this planetary speed suitable for disturbance-free normal operation, the material is eroded layer-for-layer, whereas, in the vicinity of critical regions the speed, pulse parameters and servo control parameters are adjusted. No-load regions are then traversed with increased planetary speed. Overall, machining therefore always occurs with the most suitable planetary speed, which accounts for the local work conditions and work progress, so that optimal machining times are achieved with improved shape accuracy.

In order to guarantee shape trueness, it is verified at the end of machining of each layer whether each sector of the current layer was machined with the required accuracy. If this is the case, the end of this working step is reached. In other words, if a site is no longer eroded during a complete planetary revolution, the next layer will be engaged.

During a revolution, a no-load condition can therefore be recognized on the current layer if erosion is no longer occurring, and the remaining region will be traversed with increased speed to the end of this layer.

During machining with electrodes with a non-round cross section, the computer numeric control unit 15 can adjust the planetary speed to avoid time losses as follows. Immediately before the end of machining of a layer, only those layers where more material is eroded are ordinarily still eroded (i.e., typically along the sides of the non-round machining electrode). If the planetary speed at the other sites is correspondingly adjusted, virtually no time losses overall are produced. The importance of scanning cycles becomes apparent, particularly in this example. The fact that the scanning cycles run at lower planetary speed can be recognized thanks to the larger working gap of the site still to be eroded, which would remain unrecognized at normal planetary speed.

An exemplary application of the teachings of the invention, in conjunction of the so-called aftercutting during wire erosion, will now be briefly taken up. As is known, wire erosion occurs by the relative movement of a trailing electrode relative to a workpiece, in which a limited distance (the spark gap) remains between these parts and an electric discharge occurs over the spark gap. Initially, a full cut is carried out, so that the geometry of machining is already essentially impressed. Several (for example, 5 or 6) aftercuts then occur, which lead to the desired machining result (i.e., the desired shape accuracy and roughness). This full cut, together with the aftercuts, represents the cyclic machining during wire erosion.

Progressive reduction of the parameters occurs from aftercut to aftercut. Disorders that appear during the full cut or an aftercut are considered, at least in the subsequent aftercut. Because of this, during wire erosion, a particular advantage is gained in that fragile sites in layers can be treated with particular caution and damage to the surface can be avoided.

The above disclosure focused upon cavity sinking and wire erosion (WEDM). However, it is also possible to employ the teachings of the invention in so-called EDM milling. With consideration of the process specific properties, the teachings of the invention are also applicable to electrochemical machining (ECM), laser caving, fast prototyping and other machining methods with cyclic work progress.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method for electrical discharge or electrochemical machining of workpieces, in which a machining electrode is moved relative to a workpiece, in which machining is performed in cycles, and in which appropriate process parameters for machining of a current cycle are adjusted with consideration of the process parameters of the current cycle, and in which at least one of the process parameters varies as a function of electrode location within a cycle, wherein at least one stored process parameter of at least one previous cycle is used to adjust the at least one of the process parameters of the current cycle to address a cycle location specific effect.

2. A method according to claim 1 wherein during the at least one previous cycle, at least one process parameter is measured;
   at least one process parameter to be adjusted for the current cycle is derived from the at least one measured process parameter;
   the at least one derived process parameter is stored during the at least one previous cycle; and
   the at least one stored process parameter is adjusted during the current cycle.

3. A method according to claim 1 in which process parameters permanently stored in a table are used as an alternative or additionally for adjustment of the process parameters during the current cycle, which are established with reference to optimization of removal rate, and with reference to at least one of performance of a no-load and performance of a guaranteed disturbance-free machining.

4. A method according to claim 1 wherein the machining cycles involve at least one of:
   cavity sinking widening;
   wire erosion machining with at least one aftercut; and
   wire erosion machining with pocketing.

5. A method according to claim 1 wherein the previous cycle is investigated by a value comparison of the measured process parameters in sections in which at least one of a machining disturbance, a no-load condition and another condition deviating from the normal case occurs, and adjusted process parameters are set, at least in the corresponding sections of the current cycle.

6. A method according to claim 5 wherein the adjusted process parameters are set in a region before the corresponding sections of the current cycle.

7. A method according to claim 6 wherein the length of the region is chosen as a function of planetary speed.

8. A method according to claim 5 wherein, after adjustment of the process parameters at the beginning of a sector, up to measurement of the process parameters at the end of a sector, only selected process parameters are monitored for special disturbances.

9. A method according to claim 1 wherein machining is divided into a number of layers and sectors and at least some of the process parameters are stored layer-and sector-wise.

10. A method according to claim 9 wherein the process parameters for the current cycle are set at the beginning of a sector, which are derived from the measured process parameters of previous cycles, and the process parameters of the current cycle are recorded and stored at the end of the sector as measured quantities for a cycle following the current cycle.

11. A method according to claim 1 wherein the stored process parameters are multiplied by a weighting factor after each cycle.

12. A method according to claim 11 wherein cycles with disturbance-affected sections are multiplied by an increased weighting factor.

13. A method according to claim 1 wherein the at least one stored process parameter includes at least one of the following parameters:
   a sum of servo-inteps error;
   discharge power;
   average discharge current;
   average erosion voltage;
   ignition delay time;
   a percentage of short-circuit pulses;
   a percentage of instability;
   a frequency of programmed return movements;
   a number of interventions in the process to avoid degenerate pulses; and
   average pause voltage.

14. A method according to claim 1 wherein the process parameters to be adjusted include at least one of the following parameters:
   planetary speed;
   pulse parameters, including at least one of
     period duration,
     pause duration,
     current, and
     voltage;

servo control parameters including at least one of
amplification, and
servo reference value; and programmed return movements including at least one of
frequency of return movements,
stroke of return movements, and
strategy during return movements.

15. A method according to claim 1 wherein a planetary speed is optimized as a process parameter to be adjusted with respect to removal rate, in which this is determined from several cycles with different planetary speeds in which each cycle is conducted with a constant planetary speed.

16. A method according to claim 1 wherein a planetary speed is optimized as a process parameter to be adjusted with respect to machining accuracy, in which a cycle is run with a planetary speed reduced relative to a removal rate-optimized planetary speed, and the planetary speed optimized in machining accuracy is determined by the measured process parameter.

17. A method according to claim 16 wherein at least one of the removal rate-optimized planetary speed and the planetary speed optimized in machining accuracy is periodically determined after a specific number of cycles, or on occurrence of relevant changes in process parameters.

18. A device for performing electrical discharge or electrochemical machining of a workpiece comprising:
a machining electrode operatively coupled to means for moving the machining electrode relative to the workpiece;
control means for carrying out the machining process in cycles;
means for adjusting process parameters, the means for adjusting process parameters arranged to adjust the process parameters for machining of a current cycle based at least in part upon consideration of the process parameters of the current cycle;
means for varying at least one of the process parameters as a function of electrode location within a cycle;
means for storing at least one of the process parameters; and
wherein the at least one stored process parameter from a previous cycle is used to adjust at least one of the process parameters of the current cycle to address a location specific effect.

19. The device of claim 18, the storage means arranged to permanently store process parameters in a table, and wherein the adjustment means is arranged to use the permanently stored process parameters as an alternative or an addition to the process parameters during the current cycle, the adjustment means further arranged to establish the process parameters with reference to optimization of removal rate, and with reference to at least one of performance of a no-load and performance of a guaranteed disturbance-free machining.

20. The device of claim 18, including means for measuring the at least one process parameter, the means for adjusting the at least one process parameter arranged to derive the at least one process parameter for the current cycle from the at least one measured process parameter, the storage means arranged to store the at least one derived process parameter from the previous cycle, and further wherein the means for adjusting is arranged to adjust the at least one stored process parameter during the current cycle.

* * * * *